3,347,914
HYDROXY-BENZENESULFONYL-UREAS AND
PROCESS FOR THEIR MANUFACTURE
Heinrich Ruschig and Gerhard Korger, Bad Soden,
Taunus, Walter Aumüller, Kelkheim, Taunus, and
Werner Schmidt, Frankfurt am Main, Germany,
assignors to Farbwerke Hoechst Aktiengesellschaft
vormals Meister Lucius & Brüning, Frankfurt am
Main, Germany, a corporation of Germany
No Drawing. Filed Apr. 12, 1963, Ser. No. 272,519
Claims priority, application Germany, Apr. 21, 1962,
F 36,621
9 Claims. (Cl. 260—553)

It is known that sulfonyl-ureas, such as N-(4-amino-benzenesulfonyl)-N'-butyl-urea and N-(4-methyl-benzenesulfonyl)-N'-butyl-urea have a favorable action on certain hepatic disorders. As is likewise known, these compounds cause, however, a strong lowering of the blood sugar level; furthermore, the N-(4-amino-benzenesulfonyl)-N'-butyl-urea likewise shows a bacteriostatic effect which is not desired in this connection. Therefore, these compounds have considerable disadvantages so that they cannot be used for a general liver therapy.

Now, we have found that hydroxy-benzenesulfonyl-ureas of the general formula

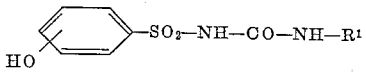

wherein $R^1$ represents a cycloalkyl radical having from 5 to 8 carbon atoms which may contain double linkages or may be substituted by further alkyl groups, and their salts show a considerable liver protecting action without reducing the blood sugar level or exerting a chemotherapeutic effect.

The subject matter of the invention are, therefore, benzenesulfonyl-ureas of the above-indicated general formula.

The present invention further relates to the preparation of said hydroxy-benzenesulfonyl-ureas according to processes which can generally be used for the production of sulfonyl-ureas.

Most of the reactions for the synthesis in question consist in reacting compounds of the general formula

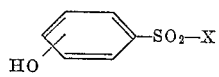

with compounds of the general formula Y—R. In these formulae X and Y represent two radicals which in the course of the reaction together deliver a urea linkage.

It is, for instance, possible to react hydroxy-benzenesulfonamides with cycloalkyl-isocyanates of the formula $R^1$—NCO, using the hydroxy-benzenesulfonamides suitably in the form of salts. Instead of the cycloalkyl-isocyanates there can likewise be used compounds which in the course of the reaction form isocyanates or react like isocyanates.

It is likewise possible to react hydroxy-benzenesulfonyl-carbamic acid esters containing in the ester component an alkyl group of low molecular weight or a phenyl radical, or corresponding hydroxy - benzenesulfonyl - monothiocarbamic acid esters with amines of the formula $R^1$—$NH_2$ or, in a reverse reaction, carbamic acid esters of the formula $R^1$—NH—$COOR^2$, wherein $R^2$ represents an alkyl group of low molecular weight or a phenyl radical, or correspondingly substituted monothiocarbamic acid esters with hydroxy-benzenesulfonic acid amides.

Carbamic acid halides of the formula $R^1$—NH—COCl can likewise be used for the reaction with hydroxy-benzenesulfonic acid amides.

Furthermore, corresponding hydroxy-benzenesulfonyl-ureas unsubstituted at the side of the urea molecule opposite to the sulfonyl group or mono- or disubstituted by other alkyl groups or aryl radicals can be converted into the desired compounds by reaction with amines of the formula $R^1$—$NH_2$, if desired in the form of their salts. Instead of benzenesulfonyl-ureas substituted in the above-described manner the corresponding N-(hydroxy-benzenesulfonyl)-N'-acyl-ureas or likewise bis-(hydroxy-benzenesulfonyl)-ureas can likewise be used. It is, for instance, possible to treat bis-(hydroxy-benzenesulfonyl)-ureas or N-(hydroxy-benzenesulfonyl)-N'-acyl-ureas with amines of the formula $R^1$—$NH_2$ and to heat the salts obtained to temperatures above 100° C.

Furthermore, it is possible to start from ureas of the formula $R^1$—NH—CO—$NH_2$ or acylated ureas of the formula $R^1$—NH—CO—NH—acyl, wherein acyl represents an aliphatic acid radical, preferably of low molecular weight, or an aromatic acid radical or the nitro group, or from diphenyl-ureas of the formula

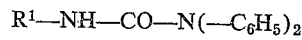

in which the phenyl radicals may be substituted and linked to one another directly or through a bridge, or from dicycloalkyl-ureas of the formula $R^1$—NH—CO—NH—$R^1$ and to react these with hydroxy-benzene-sulfonamides.

It is likewise possible to react basified urea derivatives such as isourea ethers or salts of mono-$R^1$-substituted parabanic acids with tertiary amines and hydroxy-benzenesulfonic acid halides and to convert the hydroxy-benzenesulfonylisourea ethers or the hydroxy-benzenesulfonyl-parabanic acids by hydrolysis into the desired hydroxy-benzenesulfonyl-ureas.

Finally, it is possible to prepare the corresponding hydroxy-benzenesulfonyl-thioureas and to exchange in these compounds the sulfur atom of the thiourea group in the usual manner against an oxygen atom, for instance with the aid of oxides or salts of heavy metals or by using oxidizing agents such as hydrogen-peroxide, sodium-peroxide and nitrous acid.

In the above-mentioned processes the o-, m- and p-hydroxy-benzenesulfonic acid chlorides or the corresponding amides, carbamic acid esters, ureas, isourea ethers, parabanic acids, thioureas used as starting substances can be applied in free form as well as in the form of compounds in which the hydroxy group is protected by a radical which, later on, can be split off. As protecting groups there may preferably be used acyl radicals such as acetyl, propionyl, benzoyl; alkoxy-carbonyl radicals such as methoxy-carbonyl, ethoxy-carbonyl, benzyloxy-carbonyl radicals as well as the benzyl group. As far as the protective group is not already split off in the course of the reaction, it can be eliminated from the N-(acyloxy-benzenesulfonyl)- or N-(benzyloxy-benzenesulfonyl)-N'-cycloalkyl-ureas formed or from their derivatives by hydrolysis with alkaline agents or acids or hydrogenolytically respectively.

The use of protective groups renders possible to apply as further processes for the preparation of hydroxy-benzenesulfonyl-ureas the reaction of acylated hydroxy-benzenesulfonyl-isocyanates or that of hydroxy-benzenesulfonyl-carbamic acid halides with amines of the formula $R^1NH_2$ or likewise derivatives of such compounds, as, for instance, formylated compounds. From the products obtained the protective group and the group which might have been introduced with the amines are subsequently split off by hydrolysis.

As amines there are used for the reactions, amongst others, cyclopentylamine, cyclohexylamine, cycloheptylamine, cyclooctylamine, 2-, 3- and 4-methyl-cyclohexylamine, $\Delta^2$-cyclopentenylamine, $\Delta^2$-cyclohexenylamine. Instead of the aforementioned amines the carbamic acid esters, carbamic acid halides, ureas, isourea-ethers and parabanic acids obtainable from the amines can be used for the reaction with appropriate hydroxy-benzene-sulfonamides.

The methods of operating the process of the invention can be varied to a large extent as regards the reaction conditions and the conditions prevailing in each individual case. For example, the reactions can be carried out with the use of solvents at room temperature or at an elevated temperature.

Due to their pharmacological properties the benzenesulfonyl-ureas obtained according to the process of the present invention are valuable medicaments. The new compounds are characterized in particular by a necrotropic liver protective action. For some of the hydroxy-benzenesulfonyl-ureas according to the invention, here used as examples, the following table shows the reduction of the necrosis forming action of allyl alcohol in rats. The values were ascertained by comparing the hepatic disorders of treated animals with that of control animals not treated with N-(4-hydroxy-benzenesulfonyl)-N'-cyclohexyl-urea. The method of measuring liver injuries and the action of necrotropic substances was described by W. Eger (cf. Arzneimittelforschung 7, 601 (1957)).

or dragées preferably contain the benzenesulfonyl-urea in an amount not less than 50 milligrams and not higher than 500 milligrams, the range between 100 and 200 milligrams per tablet, capsule or dragée being the most preferred one.

The following examples serve to illustrate the invention but they are not intended to limit it thereto:

EXAMPLE 1

N-(4-hydroxy-benzenesulfonyl)-N'-cyclohexyl-urea 34.6 grams of 4-hydroxy-benzene-sulfonamide are dissolved in 800 milliliters of acetone and after addition of 83 grams of potassium carbonate heated to the boil for 1 hour. 25 grams of cyclohexyl-isocyanate are then added and the reaction mixture is boiled for a further 15 hours. The acetone is distilled off under reduced pressure and the remaining residue is dissolved in water, the solution is clarified with charcoal and the filtrate is acidified by means of dilute hydrochloric acid. The precipitate that has separated is filtered off with suction and recrystallized from aqueous methanol. There is thus obtained the N-(4-

TABLE

| Compound | Eger test—preventive (percent) | | Eger test—curative (percent) | |
|---|---|---|---|---|
| | 25 mg./100 g. | 50 mg./100 g. | 25 mg./100 g. | 50 mg./100 g. |
| HO—⟨C6H4⟩—SO2—NH—CO—NH—⟨C6H10⟩—H | 45 | 70 | 40 | 50 |
| HO—⟨C6H4⟩—SO2—NH—CO—NH—⟨C5H8⟩—H | 35 | 50 | | |
| HO—⟨C6H4⟩—SO2—NH—CO—NH—cycloheptyl | 10 | 25 | | |
| HO—⟨C6H4⟩—SO2—NH—CO—NH—cyclooctyl | 30 | 45 | | |
| HO—⟨C6H3(OH)⟩—SO2—NH—CO—NH—⟨C6H10⟩—H | 45 | 40 | | |

It results from the table that, for example, the N-(4-hydroxy-benzenesulfonyl)-N'-cyclohexyl-urea in a dose of 50 milligrams/100 grams of body weight reduces in rats the necrosis forming action of the allyl alcohol in the preventive test by 70%. When it is applied in a dose of 25 milligrams/100 grams a necrotropic action of the preparation by 45% is attained.

The sulfonylureas of the invention are particularly suitable as liver protecting substances, since they exert no or only a practically insignificant hypoglycemic action and do not possess a chemotherapeutical action in the sense of a sulfonamide. For example, the oral application of 400 mg./kg. of N-(4-hydroxy-benzenesulfonyl)-N'-cyclohexyl-urea causes no hypoglycemic action in the rabbit.

The sulfonylureas of the present invention are destined to be preferably used for the production of liver protecting substances to be orally or parenternally administered, and can be applied as such or in the form of salts. For the salt formation there can be used, for instance, alkaline agents such as alkali metal hydroxides, carbonates or bicarbonates or alkaline earth metal hydroxides, carbonates or bicarbonates, furthermore physiologically tolerated organic bases. As medicinal preparations they are administered in the form of tablets, capsules, dragées, solutions and suspensions containing the products of the invention or their salts in addition to the usual inert carriers and adjuvants, such as lactose, starch, gelatine, magnesium stearate, vegetable oils, talc, tragacanth, water and the like.

Medicinal preparations in the form of tablets, capsules hydroxy-benzenesulfonyl)-N'-cyclohexyl-urea in the form of white crystals and melting at 192–194° C. (yield 37–40 grams).

EXAMPLE 2

N-(3-hydroxy-benzenesulfonyl)-N'-cyclohexyl-urea 21.9 grams of N-(3-hydroxy-benzenesulfonyl)-N'-cyclohexylthiourea having a melting point of 177–179° C. (prepared by reaction of 3-hydroxy-benzene-sulfonamide with cyclohexyl-mustard oil in the presence of pulverized caustic potash and dimethyl-formamide as well as acetone as solvent) are dissolved in 350 milliliters of acetone, and at a temperature ranging between 0 and +5° C. there are successively added, while stirring, a solution of 4.83 grams of sodium nitrite in 25 milliliters of water and 44 milliliters of 5 N-acetic acid. The reaction mixture is additionally stirred for 2 hours at 10–20° C., a great part of the acetone is distilled off under reduced pressure, the sulfur formed in the course of the reaction is filtered off and water is added to the filtrate. The semi-solid precipitate that has separated is filtered off with suction and recrystallized from dilute methanol. The yield in N-(3-hydroxy-benzenesulfonyl)-N'-cyclohexyl-urea amounts to 16.3 grams. Melting point 159–161° C.

In an analogous manner there is obtained from N-(4-hydroxybenzenesulfonyl) - N' - (4'-methyl-cyclohexyl)-thiourea, melting at 187–189.5° C., by treatment with sodium nitrite and dilute acetic acid, the N-(4-hydroxy-benzensulfonyl )- N'-(4'-methylcyclohexyl) - urea of a melting point of 102–104° C. in the form of the semihydrate (after recrystallization from dilute methanol). In the same manner there is obtained from N-(4-hydroxy-benzenesulfonyl) - N' - cyclohexyl-thiourea of a melting point of 167–168° C. the N-(4-hydroxy-benzenesulfonyl)-N'-cyclohexyl)-urea which melts at 193–195° C.

EXAMPLE 3

*N-(4-hydroxy-benzenesulfonyl)-N'-cyclohexyl-urea*

14.4 grams of N-(4-carbomethoxy-hydroxy-benzenesulfonyl)-carbamic acid methyl ester of a melting point of 126–130° C. (prepared by reaction of 4-hydroxy-benzenesulfonamide with 2.5 times the molar amount of chloroformic acid methyl ester in the presence of ground potassium carbonate and acetone) are mixed with 10 grams of cyclohexylamine and heated for 35 minutes to 130° C. The reaction product is dissolved in acetic acid ester and the solution is shaken out several times with dilute ammonia (1.25). The combined alkaline solutions are clarified with charcoal and the filtrate is acidified with dilute hydrochloric acid. The precipitate that has separated is filtered off with suction and recrystallized from dilute methanol while adding charcoal. There is obtained the N-(4-hydroxy-benzenesulfonyl)-N'-cyclohexyl - urea of a melting point of 192–194° C. The compound is identical to the product obtained according to the isocyanate method (cf. Example 1) or to that obtained by desulfurization of the corresponding sulfonyl-thiourea (cf. Example 2).

EXAMPLE 4

*N-(4-hydroxy-benzenesulfonyl)-N'-cyclohexyl-urea*

11.6 gram of N-(4 - hydroxy - benzenesulfonyl)-carbamic acid methyl ester of a melting point of 160–162° C. (prepared by reaction of 4-hydroxy-benzenesulfonamide with chloroformic acid methyl ester in the presence of ground potassium carbonate and acetone and treatment of the first resulting sulfonyl-urethane by means of dilute sodium hydroxide solution in the heat) are mixed with 5 grams of cyclohexylamine and heated for 45 minutes to 140–145° C. The resulting melt is treated by means of dilute ammonia, any undissolved parts are filtered off and the filtrate is acidified by means of dilute hydrochloric acid. The N'-(4-hydroxy-benzenesulfonyl) N'-cyclohexyl-urea thus obtained after having been recrystallized from methanol melts at 192–194° C. and is identical to the products prepared according to other methods.

EXAMPLE 5

*N-(4-hydroxy-benzenesulfonyl)-N'-(4'-methyl-cyclohexyl)-urea*

21.6 grams of N-(4-hydroxy-benzenesulfonyl)-urea of a melting point of 186–187° C. (prepared by boiling 4-hydroxy-benzenesulfonamide with potassium cyanate in aqueous ethanol) are boiled under reflux for 2½ hours in 400 milliliters of toluene and 80 milliliters of glycol-monomethyl ether with addition of 6 grams of glacial acetic acid, with 12.4 grams of 4-methyl-cyclohexyl-amine. The reaction product is shaken out with sodium hydroxide solution of 1% strength; the combined aqueous phases are clarified with charcoal and acidified by means of dilute hydrochloric acid. The precipitating product is dissolved in ammonia of 1% strength, the solution is again clarified with charcoal and the filtrate is acidified. The separated precipitate is filtered off with suction and recrystallized from dilute methanol.

There is obtained the N-(4-hydroxy-benzenesulfonyl) N'-(4'-methyl-cyclohexyl)-urea in the form of the semihydrate and melting at 102–104° C. (yield 12 grams).

In an analogous manner there is obtained from N-(4-hydroxy-benzenesulfonyl)-urea and cyclopentenylamine the N-(4-hydroxy - benzenesulfonyl)-N'-cyclopentenyl-urea melting at 185–187° C. (after recrystallization from acetate).

In the same manner and with the use of cycloheptyl-amine there is obtained the N-(4-hydroxy-benzenesulfonyl)-N'-cyclo-heptyl-urea which after having been recrystallized from ethyl-acetate melts at 176–178° C.

If cyclooctylamine is used, there is obtained according to the same method the N-(4-hydroxy-benzenesulfonyl) N'-cyclooctyl-urea which after having been recrystallized from dilute ethanol is obtained in the form of the monohydrate and melts at 122–124° C.

EXAMPLE 6

*N-(4-hydroxy-benzenesulfonyl)-N'-cyclohexyl-urea*

10.8 grams of 4-acetoxy-benzene-sulfonamide and a solution of 2 grams of sodium hydroxide in 4 milliliters of water are introduced into 30 milliliters of acetone. 6.5 grams of cyclohexyl-isocyanate are dropped to the solution while stirring and cooling with ice, the mixture is additionally stirred until the odor of isocyanate has disappeared, the major part of the acetone is eliminated by evaporation and water and acid are added to the residue. The product (after recrystallization showing a melting point of 172–174° C.) is heated for 30 minutes on the steam bath with 100 milliliters of 2 N-sodium hydroxide solution, the solution is clarified with charcoal, acidified, the product is filtered off with suction and recrystallized from a mixture of ethanol and water. After drying at 100° C., the N-(4-hydroxy-benzenesulfonyl)-N'-cyclohexyl-urea melts at 192–194° C.

EXAMPLE 7

*N-(3-hydroxy-benzenesulfonyl)-N'-cycloheptyl-urea*

23 grams of 3-hydroxy-benzenesulfonyl-carbamic acid methyl ester are mixed with 14 grams of cycloheptyl-amine and heated in an oil bath for 1 hour at 130° C. A clear melt is formed from which methanol escapes. The melt is allowed to cool, the product is treated with ammonia of about 1% strength, filtered and acidified. The precipitating substance is separated and recrystallized from water with an addition of a small amount of ethanol. The N-(3-hydroxy - benzenesulfonyl)-N'-cyclo-heptyl-urea obtained melts at 108–110° C.

EXAMPLE 8

*N-(4-hydroxy-benzenesulfonyl)-N'-cyclohexyl-urea*

27.3 grams of 4-acetoxy-benzenesulfonyl-methyl-urethane (prepared from 4-hydroxy-benzenesulfonyl-methyl-urethane and acetanhydride in pyridine) are thoroughly mixed with 9.9 grams of cyclohexylamine and heated in the bath for 1 hour to 130° C. A clear melt is formed from which methanol escapes. The melt is allowed to cool, the reaction product is taken up in 100 milliliters of 2 N-sodium hydroxide solution and heated for 30 minutes on the steam bath. The solution is clarified with charcoal and acidified after cooling. The precipitating product is filtered off with suction and recrystallized from a mixture of ethanol and water. The melting point of the N-(4-hydroxy - benzenesulfonyl)-N'-cyclohexyl-urea amounts to 192–194° C.

EXAMPLE 9

*N-(4-hydroxy-benzenesulfonyl)-N'-cyclohexyl-urea*

17.3 grams of 4-hydroxy-benzene-sulfonamide are heated for 4 hours, while stirring, with 27.6 grams of pulverized potassium carbonate and 250 milliliters of dimethylformamide. 55.8 grams of N,N-diphenyl-N'-cyclohexyl-urea are then added and the mixture is heated for a further 4 hours to 100° C. with stirring. After cooling, the reaction mixture is poured into 3 liters of water, a small amount of dilute sodium hydroxide solution is added and the whole is cooled with ice. It is filtered, the filtrate is acidified by means of hydrochloric acid, the precipitate is filtered off with suction and reprecipitated from dilute ammonia. The N-(4-hydroxy-benzenesulfonyl)-N'-cyclohexyl-urea is recrystallized from methanol and, after drying, melts at 192–194° C.

We claim:

1. A compound of the group consisting of (1) hydroxy-benzenesulfonyl-ureas of the formula

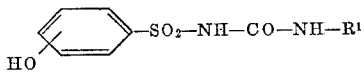

in which $R^1$ is a cycloalkyl radical having 5 to 8 carbon atoms and (2) pharmaceutically acceptable basic salts thereof.

2. N-(4-hydroxy - benzenesulfonyl) - N' - cyclohexyl-urea.

3. N-(3 - hydroxy - benzenesulfonyl)-N'-cyclohexyl-urea.

4. N - (3-hydroxy - benzenesulfonyl)-N'-(4-methyl-cyclohexyl)-urea.

5. N - (4 - hydroxy - benzenesulfonyl)-N'-(4'-methyl-cyclohexyl)-urea.

6. N - (4 - hydroxy-benzenesulfonyl)-N'-cyclopentyl-urea.

7. N - (4-hydroxy - benzenesulfonyl)-N'-cycloheptyl-urea.

8. N - (4 - hydroxy - benzenesulfonyl)-N'-cyclooctyl-urea.

9. N - (3 - hydroxy - benzenesulfonyl)-N'-cycloheptyl-urea.

References Cited

UNITED STATES PATENTS

| 2,968,158 | 1/1961 | Ruschig et al. | 260—553 X |
| 2,976,317 | 3/1961 | Ruschig et al. | 260—553 |
| 3,075,881 | 1/1963 | Nordmann | 167—65 |

FOREIGN PATENTS

| 1,165,628 | 6/1958 | France. |
| 815,885 | 7/1959 | Great Britain. |

OTHER REFERENCES

Haack, Arzn. Forsch., vol. 8, pages 444 to 448 (1958).

Ruschig et al., Arzn. Forsch., vol. 8, pages 448 to 454 (1958).

Appendix to Diario do Governo, Boletim da Propiedade Industrial, No. 4, pages 329–330 (1956).

JOHN D. RANDOLPH, *Primary Examiner.*